May 5, 1925.
F. C. MASON
BURGLARY PROTECTION MEANS
Filed Feb. 9, 1920
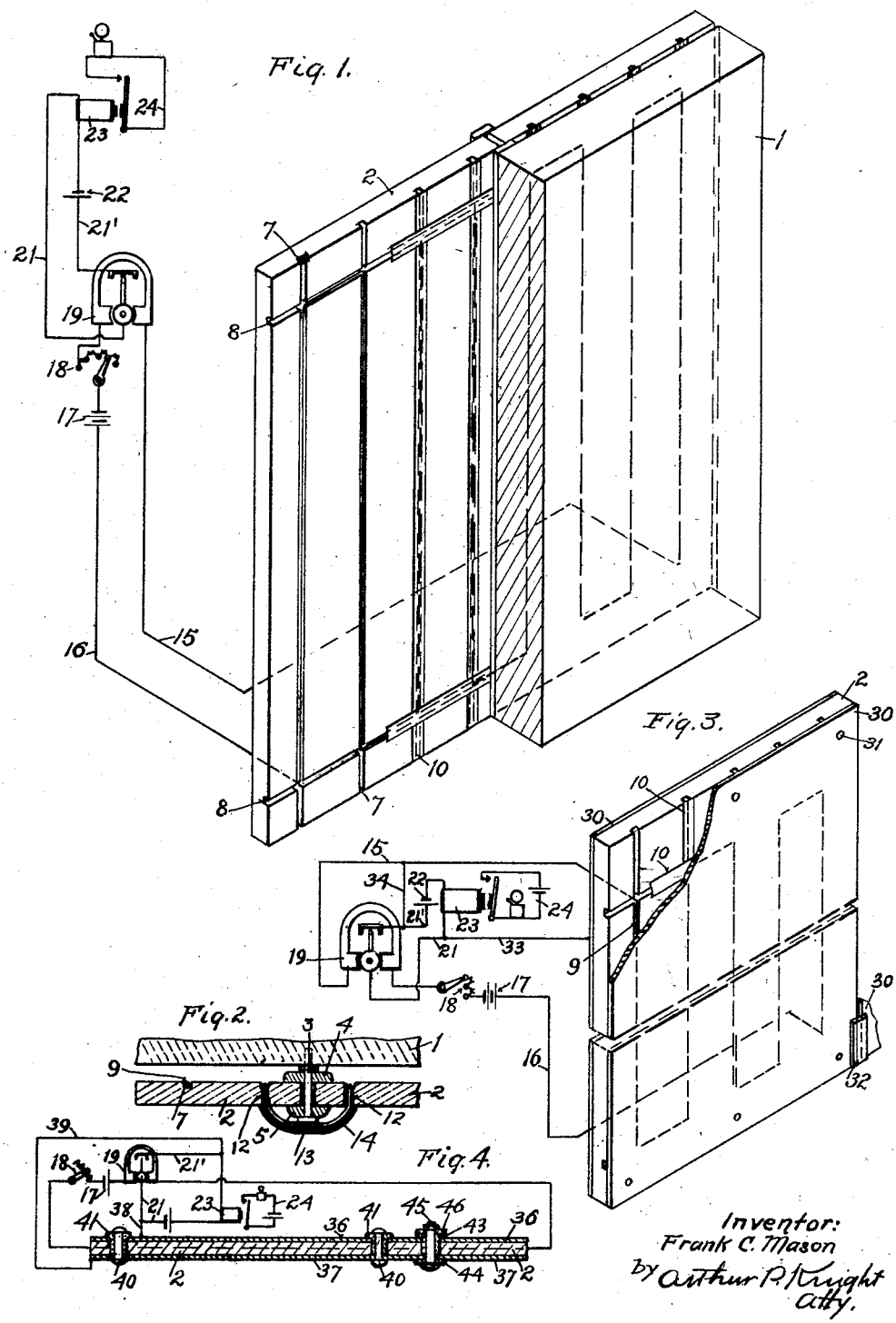
Inventor:
Frank C. Mason
by Arthur P. Knight
Atty.

Patented May 5, 1925.

1,536,804

UNITED STATES PATENT OFFICE.

FRANK C. MASON, OF LOS ANGELES, CALIFORNIA.

BURGLARY-PROTECTION MEANS.

Application filed February 9, 1920. Serial No. 357,124.

*To all whom it may concern:*

Be it known that I, FRANK C. MASON, a citizen of the United States, residing at Los Angeles, in the county of Los Angeles and State of California, have invented a new and useful Burglary-Protection Means, of which the following is a specification.

This invention relates to means for safeguarding vaults or other enclosures from ingress by burglars, and the main object of the invention is to provide simple, cheap and effective means for applying electrical protective conductors to the wall of such an enclosure for connection with a burglary alarm circuit.

A further object of the invention is to provide a sectional or unit construction comprising element sections or units of identical structure and adapted to be assembled in any suitable manner to form a protective wall or enclosure.

The accompanying drawings illustrate embodiments of my invention, and referring thereto:

Fig. 1 is a perspective view of a portion of a wall of an enclosure provided with my improved protective means adapted for use with a closed electric circuit;

Fig. 2 is a detail section of a joint for the protective means;

Fig. 3 is a similar view of a form of the invention adapted for both open and closed electric circuit protection.

Referring to Fig. 1, a portion of the wall of the enclosure to be protected is indicated at 1. On either side of said wall, for example, on the inner side, are arranged a plurality of protective plates or sheets 2 consisting, for example, of wall-board, or similar insulating material, said plates or sheets being secured to one another, and, if desired, to the wall 1 by suitable means, for example, by bolts or lag screws 3 extending between the successive plates 2 (and, if desired, into connection with the wall 1), and extending through battens 4 and 5 covering the joints between the plates 2.

Each plate or sheet 2 is provided with a series of parallel vertical grooves or scorings 7 spaced sufficiently close together to afford the requisite protection and with horizontal grooves 8 extending parallel and adjacent to the upper and lower edges of the plate 2 and an electric circuit wire or conductor 9 is placed in these grooves, so as to extend alternately up and down in successive vertical grooves 7 crossing over between the successive grooves 7 alternately in the top and bottom grooves 8, so as to form a series of loops extending over the area of the plate and to give a zigzag or tortuous arrangement of the wire, serving to form an effective electrical protection. After the wire is laid in the grooves in this manner strips 10 of paper or other suitable material are applied and are laid over the grooves and secured to the plate 2 by pasting, cementing, or otherwise, to retain the wire in place, the construction being such that the protective wiring is contained or embedded within and supported by the insulating plate. While the plates are assumed to be of insulating material, it is desirable that the wire 9 should be insulated wire to avoid any leakage. Only two sections of the plates 2 are shown in Fig. 1 but it will be understood that any desired number of plates may be used, for example, so as to cover or line the entire wall of the enclosure to be protected. These plates or sections can be manufactured as separate units and assembled in place on the job with minimum of labor and expense, and when so assembled, the wires 9 of successive sections may be connected together, as shown in Fig. 2, the wires being brought through the holes 12 in the respective plates, spliced and soldered together, as indicated at 13, so as to permanently electrically connect the protective wires of adjacent sections, suitable insulating shoes 14 being provided to cover the joints.

In applying my invention in connection with a closed circuit system the circuit arrangement may be as shown diagrammatically in Fig. 1, and the respective units of the wire 9 for the structure being connected to wires 15 and 16 of an electric circuit including a battery or source of current 17, a regulating rheostat 18 and a galvanometer or electromagnetic circuit controlling means 19. The means of said galvanometer controls a relay circuit including wires 21 and 21', a battery 22 and relay 23, the latter controlling an alarm or signal circuit 24.

In the operation of the apparatus as above described, the galvanometer or electromagnetic controlling device 19 is normally energized by the battery 17 so as to hold the galvanometer needle out of contact with both of the contacts 28 and 28' on opposite sides thereof, said galvanometer needle being provided with the usual means, not shown, for moving it into connection with one of the contacts 28 on de-energization of the device 19. If, therefore, an interruption of the circuit occurs, for example, by rupture of any part of the wire 9 in any one of the sections 2, the galvanometer 19 being de-energized the galvanometer needle will make connection with contact 28 closing the relay circuit 23 and operating the alarm or signal. If, on the other hand, an attempt is made to tamper with the circuit by inserting a connection to shortcircuit the protective wires the resultant change in resistance of the protective circuit will cause the needle of the galvanometer to make connection with one or the other of the contacts 28 or 28' and operate the alarm circuit.

If desired, the protective sections 2 may be provided with metallic armor formed as linings or sheaths, as shown at 30 in Fig. 3, said sheaths consisting of sheet iron or other sheet metal, secured to the sections 2 by metallic rivets 31, or otherwise, the metallic sheathing of the several sections or units being connected together by suitable means, such as indicated at 32. With this construction the system is adapted for use on both closed and open circuits, as indicated diagrammatically in Fig. 3, wherein the connections to the closed circuit wire 9 are as above described, and in addition connection 33 is provided from the relay wire 21' to the metallic sheathing aforesaid, and the protective circuit wire 15 is connected by wire 34 to the circuit wire 21, so that if an attempted intrusion through the protective wall by a metallic instrument a connection is made between wire 9 and the metallic sheathing 30 the relay 23 will be operated by current passing from the battery through relay 23, wires 21 and 33, sheathing 9 and wires 9, 15, 34 and 21' back to battery 22, so as to cause operation of the alarm circuit.

It will be understood that the plates 2 may be placed either vertically or horizontally, and that the scorings or grooves therein may extend in any desired directions.

The plates 2, when assembled as above described, form a self supporting structure and the entire enclosure may be formed of such plates assembled in such manner as to constitute the top, bottom and side walls of such enclosure and secured together in any suitable manner. The armored or metal sheathed plates, such as shown in Fig. 3, are especially adapted for such use.

In applying the invention to the armored construction such as shown in Fig. 3, one of the battens overlapping the joint between the successive plates may be made of metal so as to electrically connect the armor of successive plates, a portion of such a batten being shown at 32 in Fig. 3. It will be understood that with the construction shown in Fig. 3 in which the armor or metal sheathing on opposite sides of each plate is connected by metallic rivets 31, the entire armor system will be in electrical connection constituting one side of the open circuit; the other side being constituted by the interior wire 9.

What I claim is:

1. In an electrical protective system a wall consisting of a series of similar sections, each section comprising an insulating plate provided with a protective conductor contained therein, and each section having a metallic sheathing secured to and extending over a face thereof, means for rigidly securing said sections together and supporting the same to form a wall structure, means for connecting said protective conductors of successive sections in series relation, means for electrically connecting the metallic sheathing of the several sections and electrical alarm circuit means having closed circuit connections including said protective conductor and open circuit connections including said protective conductor on one side of the circuit and said metallic sheathing on the other side of the circuit.

2. In an electrical protective system, a wall consisting of a series of similar sections, each section comprising an insulating plate provided with a protective conductor contained therein, metallic sheathing secured to opposite sides of each plate, said protective conductor being insulated by the material of said plate from the metallic sheathing on one side of the plate, means for insulating said protective conductor from said sheathing on the other side of said plate, means electrically connecting the metallic sheathing on the opposite sides of each plate, means rigidly securing said sections together and supporting the same to form a wall structure, means electrically connecting said protective conductors of successive plates in series relation, means electrically connecting the metallic sheathing of adjacent sections, and electrical alarm circuit means comprising closed circuit connections including said protective conductors, and open circuit connections connected at one side to said protective conductors and at the other side to said metallic sheathing.

3. In an electrical protective system, a wall element comprising an insulating plate having parallel grooves extending in one face thereof and provided with grooves extending transversely to the aforesaid grooves and a protective conductor extending back and forth within said parallel and transverse grooves so as to be embedded in said plate and extend over the same, strips of thin flexible insulating material extending over the grooves and secured to the plate, a metallic sheathing extending over said plate and over said strips of flexible insulating material and secured to the plate and a closed electric alarm circuit including said protective conductor and an open electric alarm circuit connected at one side to said protective conductor and at the other side to said metallic sheathing.

In testimony whereof I have hereunto subscribed my name this 29th day of January, 1920.

FRANK C. MASON.